United States Patent [19]
Parker

[11] Patent Number: 4,958,924
[45] Date of Patent: * Sep. 25, 1990

[54] LOW VISION EYE GLASSES

[76] Inventor: William S. Parker, 3210 Corrine Dr., Orlando, Fla. 32803

[*] Notice: The portion of the term of this patent subsequent to Sep. 20, 2005 has been disclaimed.

[21] Appl. No.: 239,449

[22] Filed: Sep. 1, 1988

Related U.S. Application Data

[63] Continuation-in-part of Ser. No. 777,829, Sep. 9, 1985, Pat. No. 4,772,113.

[51] Int. Cl.$^5$ .......................... G02C 7/06; G02C 7/08
[52] U.S. Cl. ...................................... 351/57; 351/170; 351/177
[58] Field of Search ...................... 351/57, 58, 59, 167, 351/177, 172, 175, 179, 170

[56] References Cited

U.S. PATENT DOCUMENTS 3,027,803  4/1962  Filderman .......................... 351/57 X
4,581,031  4/1986  Kozio .............................. 351/170 X

OTHER PUBLICATIONS

Journal of American Optometric Assoc., Press on Optics, 4/76 (pp. 434 & 435).

Primary Examiner—Rodney B. Bovernick
Attorney, Agent, or Firm—James H. Beusse

[57] ABSTRACT

Eye glasses are disclosed for improving the vision of people with macular degeneration, optic nerve damage or similar low vision problems. The glasses comprise two lens assemblies, each having a magnifying lens with two convex surfaces and a reducing lens with two concave surfaces. The reducing lens incorporates prism rings which focus an image or light onto an undamaged portion of the macular. A frame is employed for supporting each assembly at a predetermined distance from an eye of a user and for supporting the lenses assembly in a predetermined orientation with respect to each other with the lenses defining a fixed space therebetween. Also disclosed are the lenses themselves and the method of using them.

8 Claims, 1 Drawing Sheet

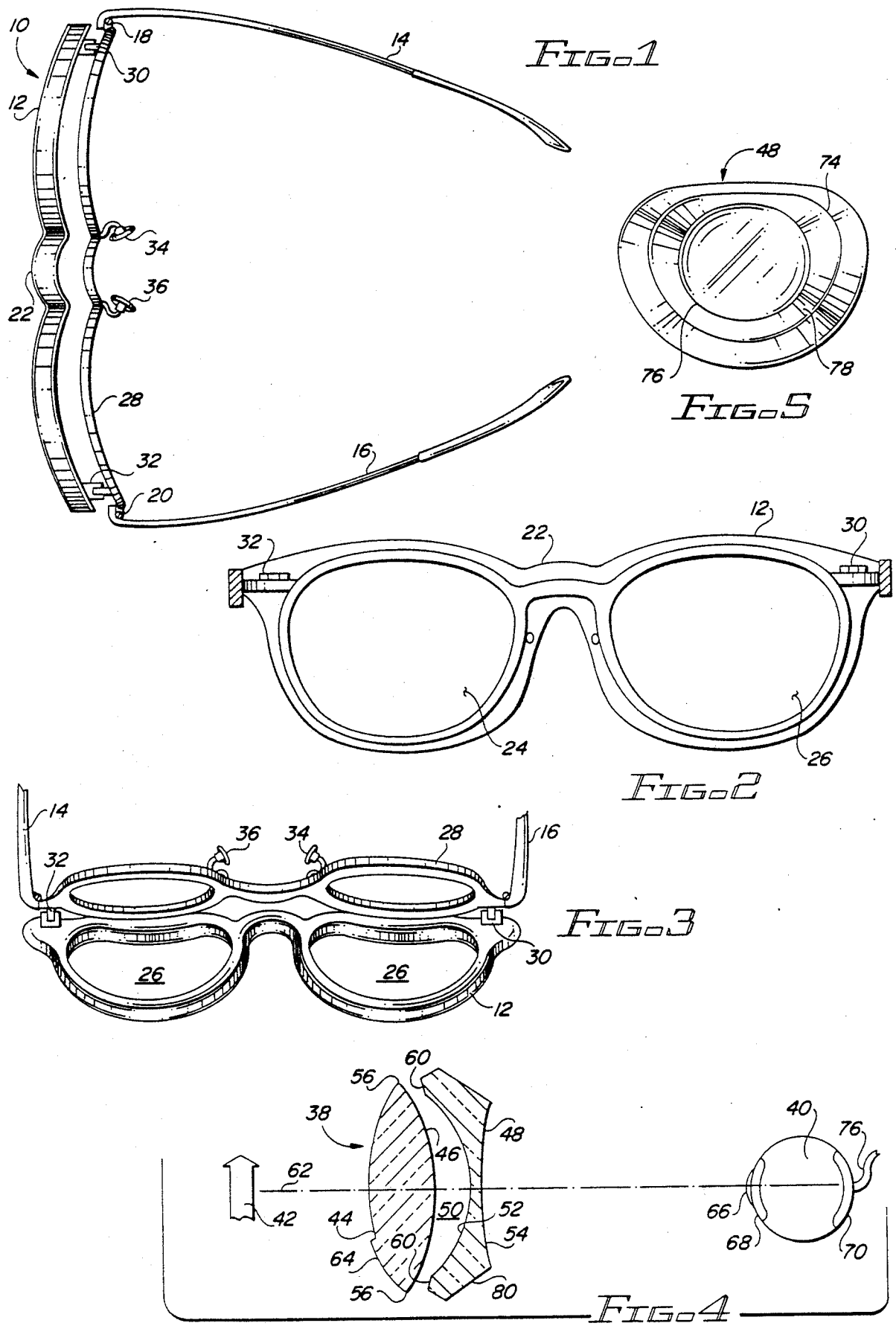

LOW VISION EYE GLASSES

BACKGROUND OF THE INVENTION

This is a continuation-in-part of application Ser. No. 777,829 filed Sept. 9, 1985 now U.S. Pat. No. 4,772,113.

FIELD OF THE INVENTION

This invention relates to improved eye glasses for use by people with macular (retinal) degeneration, optic nerve damage or similar low vision problems; to the lens assemblies, per se, used in such eye glasses; and to the method of improving the vision of a user of such eye glasses and lenses.

DESCRIPTION OF THE PRIOR ART

Various types of apparatus have been devised for people with vision problems. The most common of such apparatus are eye glasses for focusing light rays of an object being viewed onto the macular retinal membrane on the rear of the eyeball. Inadequate focusing is not uncommon and in general is caused by the improper focusing by the cornea and lens of the eyeball. When the cornea and lens do not function to properly bend or refract the incoming, image-bearing light rays, such light rays are not properly focused upon the macular retinal membrane and, as a result, the optic nerves cannot convey the proper information to the brain to effect proper vision. Many such problems are caused by nonspherical eyeballs. Mechanical lenses can normally correct this type of vision problem. Such mechanical lenses may take the form of contact lenses, eye glasses or the like and have been in common usage for many years.

When, however, faulty vision is caused either by the degeneration of the whole or part of the macular retinal membrane on the back or interior face of the eyeball, or by the deterioration of the optic nerve which would normally carry the images from the macular retinal membrane to the brain, standard lenses are generally insufficient to restore proper vision to the patient so afflicted.

Various commercial devices for overcoming low vision problems have received limited commercial acceptance. One of these devices is the Finebloom System. The Finebloom System is constructed of tube-type devices consisting of mirrors that attach to a conventional pair of eye glasses. This apparatus allows a patient using such system to focus on objects at one particular distance. The mirrors of the tubes intensify the focused light to allow the degenerated macular retinal membrane, or degenerated part thereof, or the deteriorated optic nerve to function again to thereby restore some vision. Different tubes must be utilized for focusing at different distances. Additionally, such a system restricts the user to properly pinpoint or tunnel vision.

Another low vision aid is the Opticon System. This system consists of diverging contact lenses of a negative power used in optical cooperation with additional conventional converging lenses of positive power. The positive lenses must be moved toward or away from the contact lenses and eyes of the user to focus in a manner similar to a telescope. Patients utilizing such a system have a wider field of vision than they would experience with the Finebloom System, but magnification becomes a problem. Vertex distance, or distance from the contact lens of negative power to the front of the forward lens of positive power, creates a telescopic image much larger than normal size. This results in a depth perception problem for the user. Objects being viewed thus appear much closer than they really are. Further, as a practical matter, a great percentage of users of systems of this type are older and encounter problems applying and removing their contact lenses.

Various prior art disclosures describe lens arrangements in combinations which have limited structural similarities to the lens arrangement of the present invention. The original telescope by Galileo, for example, utilized negative power lens close to the eye of the user in optical combination with a positive power lens supported by a tube at fixed distance from the negative lens. Most telescopes now provide for relative displacement between lenses to enable focusing at different distances. Furthermore, telescopes are designed for magnifying rather than for achieving the effective one-to-one focusing which is the objective for normal eye glass use.

Other lens arrangements which utilize combined lenses of positive and/or negative characteristics are found in U.S. Pat. Nos. 2,474,837 to Glancy and 3,511,558 to Uberhagen. These disclosures are directed to apparatus for use as magnifiers as in telescopes or cameras, a totally different function than the present invention which seeks to retain a one-to-one imaging with increased illumination over a range of distances for correcting low vision problems. Even though structural similarities may exist between the present invention and these prior art devices, their structural dissimilarities preclude their use for the purposes of the present invention.

Additionally, other prior art disclosures which describe lens arrangements for eye glasses can be found in U.S. Pat. Nos. 968,693 to Rohr; 2,092,789 to Tillyer; 3,702,218 to Manhire; and 3,877,978 to Tolar. In all of these prior art disclosures, the lens assemblies are directed to combinations of lenses of varying shapes and powers to correct the problems a patient may have in focusing light rays onto the macular retinal membrane as caused by an improperly functioning cornea and lens rather than focusing at a particular selected area of the retina. None of the prior art arrangements of lenses provides for light intensifying capability to help patients who have low vision problems as caused by macular degeneration, optic nerve damage or the like. In most cases, these prior art patents describe lens arrangements which combine their positive and/or negative lenses together into a single lens. They therefore function as a single lens solely for the purpose of improving the focusing capabilities of the patient. Further, as discussed above, even though structural similarities may exist between the present invention and these prior art devices, their structural dissimilarities preclude their use for the purposes of the present invention.

Although many lenses and other optical devices in various combinations have been proposed in the past for overcoming a wide range of optical problems, none teaches the present inventive use of eye glasses having lenses of positive and negative powers, separated by a fixed air space and incorporating a prism for their purposes, objectives and advantages of overcoming macular degeneration, optic nerve damage and similar low vision problems. The present invention overcomes the problems of the prior art and achieves its objectives and advantages with a minimum number of functioning parts and at a minimum cost. The present invention also eliminates both the need for a patient to endure tunnel or pinpoint vision and eliminates the need for a patient to wear a bulky apparatus or one which would require constant readjustment for focusing. These objectives and advantages should be construed to be merely illustrative of some of the more prominent features and applications of the present invention. Many other beneficial results can be attained by applying the disclosed invention in a different manner or modifying the invention within the scope of the disclosure. Accordingly, other objects and advantages, as well as a fuller understanding of the invention, may be had by referring to summary of the invention and the detailed description describing the preferred embodiments of the invention in addition to the scope of the invention as defined by the claims taken in conjunction with the accompanying drawings.

SUMMARY OF THE INVENTION

The present invention is defined by the appended claims with specific embodiments shown in the attached drawings. For the purposes of summarizing the invention, the invention may be incorporated into eye glasses for projecting light rays at essentially one-to-one magnification, comprising a first lens of positive optical characteristics, a second lens of negative optical characteristics incorporating a prism and means to secure the first lens and second lens with respect to each other. A space is formed between the lenses at least in their central regions. The first lens has at least one convex surface and, preferably, two concave surfaces. The space between the lenses is between about 1.2 millimeters and about 1.5 millimeters. The first lens has an edge thickness of between about 0.5 millimeters and about 1.5 millimeters. The side of the first lens which is closer to the second lens has a convex surface with a curvature of between about 2.13 diopter and about 4.76 diopter. The second lens has a center thickness of between about 1.2 millimeters and about 1.6 millimeters. The side of the second lens which is closer to the first lens has a concave surface with a curvature of between about 4.29 diopter and about 6.72 diopter. In an alternate embodiment of the invention, a bifocal lens is formed as part of the first lens.

The present invention also includes improved glasses for use by people with low vision problems such as macular degeneration, optic nerve damage or the like. The improved glasses comprise a lens assembly having a magnifying lens for converging received light and a reducing lens for diverging received light and a frame for supporting the lens assembly at a predetermined distance from an eye of a user and for supporting the lenses in a predetermined orientation with respect to each other with the lenses defining a space therebetween along the optical axes of the lenses. The space between the lenses is between about 1.2 millimeters and about 5.0 millimeters. The edge of the magnifying lens has a thickness of between about 0.5 millimeters and about 1.5 millimeters. The size of the magnifying lens which is adjacent to the space has a convex surface with a curvature of between about 2.13 diopter and about 4.76 diopter. The reducing lens has a central thickness of between about 1.2 millimeters and about 1.6 millimeters. The side of the reducing lens adjacent to the space has a concave surface with a curvature of between about 4.29 diopter and about 6.72 diopter. In an alternate form of the invention, the glasses may further include a bifocal lens formed as part of the magnifying lens.

The present invention may also be considered as comprising eye glasses for improving the vision of people with macular degeneration, optic nerve damage or similar low vision problems. Such eye glasses include two lens assemblies. Each assembly has a magnifying lens with two convex surfaces and an edge thickness of between about 0.5 millimeters and about 1.5 millimeters. Each assembly also has a reducing lens with two concave surface and a central thickness of between about 1.2 millimeters and about 1.6 millimeters. The lenses of each assembly are aligned along their optical axes. Such eye glasses also include a frame for supporting each lens of each assembly at a predetermined distance from an eye of a user and for supporting the lenses of an assembly in a predetermined orientation with respect to each other. The lenses of each assembly define an air space of at least between about 1.2 millimeters and about 5.0 millimeters therebetween along their optical axes. For each assembly, the side of the magnifying lens which is adjacent to the space has a surface with a convex curvature of between about 2.13 diopter and about 4.76 diopter. For each assembly, the side of the reducing lens adjacent to the space has a surface with a concave curvature of between 4.29 diopter and 6.72 diopter.

The present invention also includes the method of improving the vision of a patient suffering from a low vision problem such as macular degeneration, optic nerve damage or the like. The method comprises the steps of converging, through a first lens, image bearing light rays from an object being viewed and projecting such converged light rays toward the eye of such patient. The method also includes the steps of diverging, through a second lens, the projected light rays and projecting such diverged light rays at a predetermined location within the eye of such patient. The method further includes directing additional ambient light onto the retina for improving the image sensitivity thereof. Lastly, the method includes the step of angularly positioning the first lens with respect to the second lens so as to selectively focus an image onto a person's retina, the second lens being maintained at a predetermined distance from the eye of such patient regardless of the distance to the object being viewed.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed herein may be readily utilized as a basis for modifying or designing other structures for carrying out the same purposes of the invention. It should be realized by those skilled in the art that such equivalent constructions do not depart from the spirit and scope of the invention as set forth in the appended claims.

BRIEF DESCRIPTION OF THE DRAWINGS

For a more complete understanding of the nature, objects and advantages of the present invention, reference should be had to the following detailed description taken in conjunction with the accompanying drawings in which:

FIG. 1 is a top view of a lens frame assembly for utilizing the lenses of the present invention;

FIG. 2 is a rear view of the lens frame assembly of FIG. 1;

FIG. 3 is a bottom view of the lens frame assembly of FIG. 1 showing the hinging action of the assembly;

FIG. 4 is a cross-sectional view of one form of the inventive lens assembly; and FIG. 5 is a planar view of an inventive convex lens forming a part of the present invention.

DETAILED DESCRIPTION OF THE INVENTION

FIGS. 1, 2 and 3 illustrate one form of eye glass frame assembly 10 for supporting the inventive lens assemblies and for improving the vision of patients suffering from low vision problems such as macular degeneration, optic nerve damage or the like. The frame assembly includes a standard lens support frame or rim 12 for rigidly holding a magnification lens in proper orientation with respect to an eye of a user of such eye glasses. The rim 12 is preferably plastic so as to have low weight while providing massive support. The interior surface of rim 12 is provided with a groove in a manner well known in the art formed as an inset ledge adapted to receive the edges of a lens for maintaining it in a desired position. The frame assembly also includes elongated side stems 14 and 16 terminating in downturned arms for positioning behind the ears of a user for securing the glasses on the head of the user so as to hold the frames and, consequently, the lens assemblies, in proper orientation with respect to the eyes of a user. Hinges 18 and 20 are preferably provided at the forward ends of the stems adjacent the rims to permit the folding of the parts of the eye glasses into a compact arrangement when not in use. A bridge 22 couples two lens openings 24 and 26 across the nose of a user. In such manner, the optical axes of a lens held in the frame assembly 10 normally coincides with the optical axes of the eyeballs of a user so that the objects being viewed are usually aligned in a predetermined orientation for proper vision.

The frame assembly 10 also includes an inner frame 28 for holding a second pair of lenses in a predetermined position with respect to the lenses held in frame 12. The frame 28 is also of a type well known in the art and preferably comprises a wire frame having low mass so that the combined size of frames 12 and 18 is maintained relatively small. As can be seen in the view of FIG. 1, frame 12 is hinged to frame 28 by hinges 30 and 32 which allows the frame 12 to pivot as much as five millimeters with respect to frame 28. FIG. 3 shows the pivoted frames. As will becomes apparent from the discussion to follow, one of the innovative features of this system is the combination of a prism effect into the inventive lenses so that the viewed image may be focused onto a particular area of a retina. In some patients, e.g., diabetic patients, that portion of a retina which is responsive to light may vary from day-to-day. By providing a slight adjustment of the relative positions of the frame 12 and 28, the position of the focused image may be varied. So long as the optical centers of the lenses are not affected, the image will not deteriorate. The inner frame 28 also includes nose pieces 34 and 36 for supporting the frame assembly 10 on the nose of a user in the well known manner.

One form of lens assembly is shown in the cross-sectional view of FIG. 4. The first or outer lens 38, that lens most distance from the eye 40 of the user, is of a positive power or positive optical characteristics and functions as an enlarging lens for the optical system. Such a lens will function to converge light rays received from an object 42 being viewed. In the preferred embodiment of the invention, this lens is formed with two convex surfaces, one at its front or outer side 44 and one at its back or inner side 46. Normally, for a positive lens, at least one surface of the lens must be convex. This lens is of sufficient size to effect its appropriate imaging function with its edge thickness being between about 0.5 millimeters and about 1.5 millimeters. Its inner side 46, that side closer to the eye of a user, preferably has a convex surface with a curvature of between about 2.13 diopter and about 4.76 diopter. A diopter is a unit of measurement of the refractive power of a lens equal to the reciprocal of its focal length measured in meters.

The second lens 48 of each optical system is of a negative power or negative optical characteristics and functions to reduce the image being viewed by diverging received light rays. This lens is preferably formed with two concave surfaces, one at its front or outer side 52 and one at its back or inner side 54. This lens preferably is of slightly larger diameter than lens 38 and has a center thickness of between about 1.2 millimeters and about 1.6 millimeters. The curvature of the first or outer side 52 of the second lens 48 preferably is between 4.29 diopter and 6.72 diopter.

The various lenses of the optical assemblies are preferably formed of glass or plastic of commercial lens quality and performance characteristics. Such materials are well known in the art, readily available in the market place and are fully described in the published literature.

The space 50 between the lenses along their optical axes 62 is normally between about 1.2 millimeters and 1.5 millimeters. The image-bearing light rays from an object being viewed are converged by the first lens 38, pass through the space 50, and are then diverged by passage through the second lens 48. The lens assembly, i.e., lenses 38 and 48, is designed and configured so as to produce an essentially one-to-one magnification which is preferred for eye glass usage. The space between the lenses 38 and 40 can be varied by the hinged frame assembly. In the bifocal area, the lenses can be moved to be as much as 7.5 millimeters apart. This additional separation can provide additional magnification in the bifocal area.

While the above description is principally directed to the lens assembly or system including certain lenses and a space between them to improve the low vision problems of a user, the invention should also be construed as including the eye glass frames in combination with the lens assemblies for supporting two such assemblies with the lenses of each assembly in proper orientation with respect to each other and also in proper orientation with respect to the eyes of a user.

FIG. 4 also illustrates, added to the first lens 38, preferably on its outer or front surface 58, a bifocal lens 64. The bifocal lens is designed to effect a proper prescription and is located or disposed at the bottom of the front of the first lens adjacent the front of the rim. It constitutes a minor extent of the lens surface. This bifocal lens functions in a normal fashion as a standard bifocal lens permitting a user to read at close distances by viewing through the major extent of the lenses. Bifocals, as well as their methods of fabrication and use, are well known in the art. In addition to the normal bifocal function, eye glasses with bifocal lenses constructed in accordance with the present invention provide the image intensification functions for people with low vision problems as described herein above.

Referring to FIG. 5, there is shown a front view of the inner lens 48 of the present invention. The outer line 74 represents the beginning edge of the outer concave surface 52. The inner line 76 represents the beginning edge of the inner concave surface 54. The positions of the lines 76 and 74 have been exaggerated for clarity. The relative difference in diameter of the outer and inner concave surfaces 52 and 54 defines a prism or circular refractive interface 78 which is actually a reflection of the surface 80 (see FIG. 4). The prism surface 78 enhances the light gathering ability of lens 48 and brightens images directed to the eye. By shifting the relative position of the surfaces 52 and 54 and varying the relative size, the image can be focused on areas of the retinal membrane 70 which are active or undamaged, i.e., the optical center of the lens 48 can be shifted to change to focal area on the eye. Preferably, the diameter of the inner concave surface 54 is maintained constant while the diameter of the outer concave surface 52 may be varied as required. Typically, the surface 54 will have a diameter of 35 millimeters while the diameter of surface 52 may vary between 38 and 50 millimeters. Variation of one millimeter in the size of the defined prism surface will shift the image by five degrees angularly with respect to the optical axis of the lenses. From the above, it will be appreciated that the lens system provides two separate and distinct functions. The first function is to direct an image onto an optically responsive portion of a user's retina. The second function is to act as a light gatherer to intensify the amount of light directed toward the retina. It is believed that the light gathering function may be of more significance than the image directing function. For example, in some tests for visual acuity in which the patient is placed in a darkened room and directed to observe an image on a screen, it has been found that very little improved vision could be measured. However, the same patient in a well lighted room experienced a significant improvement in visual acuity. This light gathering function is believed due to the prism surface 78 which can be shown to be effective in directing light toward the retina. Note that it is not believed that the prism surface 78 redirects the viewed image but only that it increases the amount of light entering the eye and therefore makes the eye more sensitive to image information.

It is also noted that the prism ring or circular refractive interface 78 may have different widths and the angle of the surface 80 may vary as well as a function of the diameter and radius of curvature of the outer concave surface 52 in relation to the diameter and radius of curvature of the inner concave surface 54. As the angle of surface 80 varies, the angle at which light is reflected toward the optical center of the lens 48 will vary along with the amount of light (illumination) projected onto the retina. Other variations such as lens material, concentricity of the outer radius of curvature in relation to the inner radius of curvature will also affect the focal area of light refracted by the prism ring. Each of these elements may be controlled in order to direct illumination onto the most functional parts of the retina.

In fitting lenses of a system constructed in accordance with the present invention, a standard first or magnifying lens 38, as well as a standard second or diverging lens 48, are designed to the imaging needs of the user. A detailed description of apparatus and method for selecting lenses is given in U.S. patent application Ser. No. 226,791 now U.S. Pat. No. 4,850,690 filed Aug. 1, 1988. The first lens can be moved forward and backward during the fitting process to effectively focus the image to the needs of the patient in a manner similar to a zoom lens on a camera. When the image being viewed is being focused to a particular patient's needs and objects can be viewed clearly, this information is used to prepare a lens assembly. By computing the distance from the first lens 38 to the second lens 48, times the power of the first lens, with correct power and lens curvature, both lenses can be secured with respect to each other to form the final lens system or can be positioned in a frame assembly such as that shown in FIGS. 1-3. It is understood that for some conditions that the optical axes of the patient's lenses may have to be slightly offset from the optical axis of the eye of the patient for proper fitting. Such may occur when the light responsive portion of a patient's retina is off the optical axis of the eye.

In addition to the apparatus as described above, the present invention also includes the method of improving the vision of a patient who is suffering from low vision problems such as macular degeneration, optic nerve damage or the like. The method not only includes the steps of focusing the image being viewed, but also includes the step of intensifying the focused light on the macular retinal membrane which will effectively restore vision to a user. The method first includes the step of converging the image-bearing light rays as they are projected from the object 42 being viewed by the use of a positive power lens 38 tending to magnify the image. This lens will also project the converged light rays toward the eye of the patient, the viewer. Prior to the passage of the light rays to the eye 40 of the user, the projected light rays pass through an air space 50 and a second lens 48.

At the second lens 48, the received light rays are diverged through the negative power of the second lens 48 and such light rays are then focused onto light responsive portions of the user's retina. Additionally, the second lens 48 incorporates a prism surface 78 which functions to increase the light gathering ability of the lens system and to direct additional light onto the user's retina. This method also includes the step of maintaining the positive and negative lenses at a fixed space from each other with an appropriate air space therebetween by being held in double frame assembly 10. The method also includes the step of maintaining each of the lenses at a fixed predetermined distance from the eye 40 of the user of the apparatus regardless of the distance to the object 42 being viewed.

The present disclosure includes that information contained in the appended claims as well as that in the foregoing description. Although the invention has been described in its preferred forms or embodiments with a certain degree of particularity, it is understood that the present disclosure of the preferred forms has been made only by way of example and that numerous changes in the details of construction, fabrication and use, including the combination and arrangement of parts and steps, may be resorted to without departing from the spirit and scope of the invention.

What is claimed is:

1. A method of enhancing visual acuity in a person suffering from severe vision deterioration due to loss of light response in portions of the person's retina, the method comprising the steps of:

converging image bearing light rays from an object being viewed to form a magnified image of the object;

diverging the magnified image to correct for magnification;

focusing the diverged image onto optically responsive portions of a person's retina;

directing additional ambient light onto the person's retina for enhancing image response by:
  i. providing a diverging lens; and
  ii. forming a prism ring circumscribing a surface of the diverging lens and positioned so as to direct ambient light toward the person's retina.

2. The method of claim 1 wherein the step of assembling includes the step of providing a frame for supporting the lenses in the predetermined positions, the frame having relatively adjustable lens supports, the method further including the step of selectively adjusting the relative position of the lenses for focusing the image on different selected areas of the retinal membrane.

3. A method of enhancing visual acuity in a person suffering from severe vision deterioration due to loss of light response in portions of the person's retina, the method comprising the steps of:

converging image bearing light rays from an object being viewed to form a magnified image of the object;

diverging the magnified image to correct for magnification;

focusing the diverged image onto optically responsive portions of a person's retina; and directing additional ambient light onto the person's retina for enhancing image response.

4. The method of claim 3 wherein the step of focusing includes the step of angularly positioning a converging lens with respect to the diverging lens so as to selectively position a focal point on the person's retina.

5. Eye glasses for enhancing visual acuity of a person suffering from vision deterioration due to loss of light response in portions of the person's retina, comprising:

an outer positive lens for converging light received from an object;

an inner negative lens, spaced apart from said positive lens and positioned between said outer lens and the person's said inner lens cooperatively functioning with said outer lens to direct the light from an object onto optically responsive portions of the person's retina; and a prism ring circumscribing said inner lens and oriented to re-direct ambient light onto the person's retina.

6. The eye glasses of claim 5 wherein said prism ring is positioned about an inner surface of said inner lens.

7. The eye glasses of claim 5 wherein said inner lens is a double concave lens with the radius of the concave portion of outer surface of the lens being larger than the radius of the concave portion of the inner surface, the difference is radii defining the prism ring.

8. The eye glasses of claim 7 wherein the inner lens includes an angularly cut outer circumscribing surface between the inner surface concave portion and a radially outer edge of the inner lens, said angularly cut surface forming a circular refractive surface to refract light toward the retina.

* * * * *